US005344692A

United States Patent [19]

Schmoock

[11] Patent Number: 5,344,692

[45] Date of Patent: Sep. 6, 1994

[54] LEATHER-CONTAINING LAMINATE

[76] Inventor: Helmuth Schmoock, Düschener Weg 121, D-2058 Lauenburg/Elbe, Fed. Rep. of Germany

[21] Appl. No.: 44,990

[22] Filed: Apr. 8, 1993

Related U.S. Application Data

[63] Continuation-in-part of Ser. No. 2,116, Jan. 4, 1993, abandoned.

[30] Foreign Application Priority Data

Jun. 24, 1987 [DE] Fed. Rep. of Germany ....... 3720776

[51] Int. Cl.[5] ........................... B32B 3/00; C14C 9/00

[52] U.S. Cl. .................................... 428/161; 428/107; 428/109; 428/141; 428/172; 428/207; 428/219; 428/245; 428/246; 428/260; 428/423.4; 428/540; 264/136; 264/167; 264/241; 264/319; 156/243; 156/244.25; 156/244.27; 156/307.3

[58] Field of Search ............... 428/156, 172, 105, 107, 428/114, 904, 540, 163, 68, 95, 109, 141, 161, 207, 151, 245, 246, 260, 212, 218, 219, 423.4; 156/196, 234, 243, 244.25, 244.27, 307.3; 264/136, 167, 241, 319, 510

[56] References Cited

U.S. PATENT DOCUMENTS 4,497,871 2/1985 Henke ................................ 428/904

*Primary Examiner*—Donald J. Loney
*Attorney, Agent, or Firm*—Darby & Darby

[57] ABSTRACT

A flexible laminate, wherein a substrate of leather carries a coating which enhances the appearance and/or the quality of the substrate, is formed between an anvil and a ram in a press. The coating has an inner layer which overlies and fills or nearly fills scratches and/or other unevennesses in one side of the substrate, and an outer layer which overlies the inner layer can be made of a plastic material. The outer layer is first applied to a flexible plastic or paper carrier, and the inner layer is sprayed or otherwise applied to the outer layer before the resulting coating is introduced into or conveyed through the clearance between the anvil and the ram. The exposed surface of the outer layer can be smooth or it can be profiled to imitate the grain of a particular type of leather, such as ostrich leather or alligator leather. The inner layer is bonded to the substrate in response to the application of heat and/or pressure, and its thickness is selected in such a way that it can fill major or minor unevennesses in the adjacent side of the substrate.

10 Claims, 3 Drawing Sheets

LEATHER-CONTAINING LAMINATE

CROSS-REFERENCE TO RELATED CASE

This is a continuation-in-part of the commonly owned copending patent application Ser. No. 08/002,116 filed Jan. 4, 1993 for "Leather-containing laminate", and now abandoned.

BACKGROUND OF THE INVENTION

The invention relates to an improved method of and to an improved apparatus for making flexible laminates which contain substrates of leather. The invention further relates to flexible laminates which can be produced in accordance with the improved method by resorting to the improved apparatus. More particularly, the invention relates to improvements in a method of and in an apparatus for making a flexible laminate wherein at least one side of a substrate of leather is provided with a coating.

Leather is a preferred material for the making of a variety of useful and/or decorative products which can be put to use under a host of different circumstances. It is often necessary to subject hides or skins to extensive preliminary treatment (including tanning, dressing and others) before the thus obtained leather is in a satisfactory state for conversion into belts, bags, articles of footwear and/or many other products. For example, conversion of rawhides into calfskins or cowhides necessitates extensive treatment in order to ensure that the product will exhibit the desired flexibility and that its appearance will be acceptable for a particular purpose. Problems arise when large parts of treated skins must be discarded because they are damaged as a result of injury to the animals prior to or during killing. For example, pigskin often exhibits pronounced scars which are characteristic of pigskins or are the consequence of fights between live animals. Irrespective of their causes, such scars constitute blemishes which warrant discarding of corresponding portions of the skins.

The surfaces of skivers (i.e., thin soft leathers which are or can be made of the grain side of a split sheepskin) often do not resemble the surface of a piece of leather. This applies particularly for the grain or unevennesses in the surfaces of skivers and is the primary reason that skivers are considered second-class goods which are not used for the making of high-quality expensive leather goods. Therefore, workers in a tanning or other skin processing (finishing or dressing) plant must take care to avoid unnecessary expensive processing of skins or portions of skins whose appearance (particularly due to grain and/or other unevennesses) is unsatisfactory for the intended use of the leather. Accordingly, there exists an urgent need to provide a method of and an apparatus for salvaging skins and/or skin portions which must be discarded or used for the making of cheap products because their appearance is not satisfactory for the making of expensive leather goods.

U.S. Pat. No. 3,930,921 granted Jan. 6, 1976 to Connett for "Method of finishing leather" discloses a method which involves the transfer of a finish coating including an outer stratum of a thermoplastic acrylic polymer from a release layer bearing the finish coating to the leather. The leather and the release layer are pressed into a sandwich-like assembly with the concurrent application of sufficient heat and pressure to transfer substantially the entire finish coating to the surfaces of the leather and the backing layer juxtaposed therewith. The preformed finish can be directly applied to leather without prior treatment with adhesives or the use of so-called tie coats or other concurrently employed wet processing. The finish coating incorporates at least two distinct strata the first of which provides the base coat of the finish on the leather and is made up of thermoplastic. The second stratum forms the top coat of the leather finish and comprises a hard, non-tacky nitrocellulose lacquer. The thickness of the base coat is several times the thickness of the top coat to thus impart sufficient flexibility to the finished leather. The advantages of the method of Connett are that it can be carried out efficiently and economically, that it requires a single pass and that it provides more uniformly finished leathers than can be achieved in accordance with prior methods. Moreover, the finish coating can be transferred in the dry state without pretreatment with adhesives, tie coats and the like. Still further, the patentee emphasizes that the continuous finish film or coating produced in accordance with his method does not darken open scars or other blemishes in the leather surfaces but tends to level the color of differing portions of the leathers, such as scratches, scars or the like, more uniformly than conventional leather finishing processes.

Connett fails to disclose a method which renders it possible to fill and smooth the scratched and/or other damaged portions of leathers. The reason is that the patentee employs an adhesive acrylic polymer coating which constitutes the thermoplastic coating, and that the polymer is cross-linked. Thus, the coating which is used by the patentee does not flow but is merely applied in the form of a layer having a selected thickness to form one layer of a sandwich. Another drawback of the patented method is that Connett must operate at elevated temperatures in the range of 150°-200° C. which are necessary in connection with the making of sandwich-like structures having a layer consisting of a cross-linked polymer. On the other hand, treatment at such elevated temperatures will adversely affect certain important basic characteristics of leather, i.e., leather will become hard and brittle. The only possible mode of avoiding excessive damage to leather is to employ a relatively thick cross-linked acrylate layer which has a constant thickness and acts as a thermal insulator between the substrate of leather and the pressure applying tool.

The application of relatively thick layers to a substrate of leather is undesirable on the additional ground that this prevents the makers of such products from calling them "leather". For example, the Common Market countries adhere to regulations which permit the use of the term "leather" only if the product bears a plastic layer having a thickness less than 0.05 inch. The product of Connett employs a thermoplastic layer having a thickness of 0.07 inch plus a finish layer which causes the ultimate product to assume a thickness in excess of that contemplated for leather products by the relevant authorities of the Common Market.

U.S. Pat. No. 4,215,170 granted Jul. 29, 1980 to Oliva for "Metallization process" discloses the application of varnish to a substrate which can consist of leather. The patentee does not propose to fill in eventual scars and/or other defects of the substrate. The purpose of the method, the same as that of the method of Connett, is to create the impression of a smooth exposed surface on a substrate.

OBJECTS OF THE INVENTION

An object of the invention is to provide a novel and improved flexible laminate which exhibits the desirable characteristics (such as flexibility and resistance to wear) of leather and can be put to a number of uses including those heretofore reserved solely for selected high-quality skins and hides.

Another object of the invention is to provide a flexible laminate whose appearance can match that of high-quality leathers even though it need not contain superior grades of skins or hides.

A further object of the invention is to provide a flexible laminate which can employ low-grade and/or damaged leathers without affecting its appearance.

An additional object of the invention is to provide a novel and improved method of converting one type of leather, so that it resembles another type of leather, at a reasonable cost and in such a way that the appearance of converted leather is superior to that of the one type of leather.

Still another object of the invention is to provide a method of making a flexible laminate which contains or can contain low-grade leather but can be used for the making of objects which are normally made solely of high-quality leathers.

A further object of the invention is to provide a method which renders it possible to rapidly turn out short or long series of flexible laminates for use as, or in lieu of, high-quality leathers.

Another object of the invention is to provide a method which renders it possible to utilize pieces of leather which are not suitable for the making of numerous objects of the type presently necessitating the use of high- or highest-grade products.

An additional object of the invention is to provide a novel and improved apparatus for the practice of the above outlined method.

Still another object of the invention is to provide an apparatus which can impart to flexible leather-containing laminates any desired color, surface finish and/or other desirable characteristics at a low cost.

An additional object of the invention is to provide novel and improved coating materials for leathers.

SUMMARY OF THE INVENTION

One feature of the present invention resides in the provision of a flexible laminate having a substrate which consists of leather and at least one side of which exhibits unevennesses (e.g., unevennesses which are typical of a particular type of hide or skin (such as pigskin, ostrich leather, alligator leather and others) and/or unevennesses which are attributable to damage to the skin). The laminate further comprises a coating which is adjacent the one side of the substrate and has a first surface adhering to the substrate and a second surface which faces away from the substrate and can be smooth, embossed and/or otherwise shaped or profiled to imitate a particular type of leather and/or to produce other desirable effects such as a certain color or hue or two or more different colors or hues. The coating comprises at least one layer including an outer layer which is adjacent the second surface of the coating and preferably an inner layer which adheres to the uneven side of the substrate and serves as a means for filling or at least substantially filling the unevennesses in the one side of the substrate.

At least a portion of the inner layer is or can be thermoplastic. It has been found that hotmelt is a highly satisfactory material for the inner layer in connection with certain types of substrates. A portion of or the entire inner layer can be colorless or it can be colored but can transmit light. Coloring of the inner layer can be achieved by admixing to the basic material one or more suitable pigments, e.g., one or more pigments which enable the inner layer to transmit light or to prevent the inner layer from transmitting any light or a certain percentage of light. It is also possible to employ an inner layer which consists of or contains a lacquer and is hardened as a result of exposure to ultraviolet radiation.

In accordance with certain presently preferred embodiments, the outer layer consists of or contains a polyurethane resin, an acrylic resin, polyamide or cellulose acetate butyrate. Furthermore, the outer layer of the coating can be colorless and fully transparent or colored (e.g., tinted) and partly or fully transparent. Such outer layer can contain one or more pigments and can include one or more superimposed strata. The stratum which is immediately adjacent the second surface of the coating can exhibit satisfactory or highly satisfactory grip-enhancing (antiskid) characteristics. Furthermore, in addition to or in lieu of exhibiting satisfactory antiskid characteristics, the outermost stratum of the outer layer can contain or can be made of a material which is resistant to solvents.

If the substrate is a skiver, the weight of the inner layer can be in the range of 40–50 grams per square meter. This results in satisfactory elimination of unevennesses in the one side of the substrate even if the one side is damaged to a considerable extent and such damage would appreciably detract from the appearance of the skiver (in the absence of a coating thereon). If the substrate is not a skiver but exhibits rather pronounced unevennesses, it normally suffices to apply the inner layer in such a way that it has as weight of 20 to 40 grams per square meter. If the one side of the substrate is relatively smooth, it normally suffices to apply an inner layer having a thickness such that its weight is 20 to 25 grams per square meter.

The improved flexible laminate can further comprise (at least during making) a substantially sheet-like or web-like carrier which adheres to and is separable from the second surface of the coating. The carrier can contain a plastic material, such as a polyester resin. Alternatively, the carrier can include a sheet or web of paper and a film of separating agent or material between the paper sheet or web and the outer layer of the coating to thus ensure that the paper sheet or web can be readily separated from the coating when the application of coating to the one side of the substrate is completed. That surface of the carrier which confronts the outer layer of the coating can be smooth or embossed or otherwise profiled (e.g., grained in imitation of certain types of leathers). The carrier can constitute a reusable web of paper or plastic material.

The inner layer can be bonded to the uneven side of the substrate at a pressure of at least 20 kiloponds per square centimeter. The application can take place at a temperature of approximately 120° C. for an interval of approximately 8 seconds, at a temperature of approximately 125° C. for an interval of approximately 4 to 5 seconds, or at a temperature of 130° C. for an interval of approximately 3 seconds.

The inner layer can be applied to the substrate with assistance from a platen having a smooth or uneven surface which shapes the inner layer, either directly or through the medium of the outer layer and/or carrier. This is achieved by causing the platen to exert upon the inner layer a requisite pressure during application of the inner layer to the substrate.

The second surface of the coating can be provided with one or more deep furrows or with other configurations. Such furrow or furrows can be applied to the outer layer subsequent to application of the inner layer to the substrate, e.g., through the medium of the carrier and by resorting to the aforementioned platen. As explained above, the coating can temporarily adhere to the carrier with the interposition of a separating agent which permits rapid and predictable separation of the carrier when the application of the coating to the substrate is completed.

In accordance with a presently preferred embodiment, a flexible laminate which embodies the present invention can comprise a low-grade and/or damaged leather substrate at least one side of which has unevennesses, and a coating which is adjacent the one side of the substrate and has a first surface adhering to the one side and a second surface facing away from the substrate. The coating comprises an outer layer adjacent the second surface and an inner layer between the outer layer and the substrate to at least substantially fill the unevennesses in the one side of the substrate. The inner layer consists of a non cross-linked thermoplastic material which is flowable (e.g., liquefiable) in response to heating, and inner layer and has a dry weight of 15–50 g/m$^2$. The thermoplastic material is applied to the one side of the substrate at a temperature of 110°–130° C. and at a pressure of approximately 30–50 kp/cm$^2$ (depending on the selected temperature). The outer layer consists of a plastic material which is solid within the temperature range causing the non cross-linked thermoplastic material of the inner layer to flow.

The second surface of the coating can be a profiled surface, e.g., an embossed surface.

At least a portion of the inner layer of the coating can be a hotmelt.

The outer layer of the coating can comprise a plurality of superimposed strata including a colored stratum at the second surface of the coating and a light-transmitting second stratum of polyurethane between the colored stratum and the inner layer. The colored stratum can contain polyurethane and can have a dry weight of approximately 20 g/m$^2$. The light transmitting second stratum can have a dry weight of approximately 20 g/m$^2$. The outer layer of the coating can further comprise a third stratum consisting of lacquer and located between the second stratum and the inner layer. The third stratum can have a dry weight of 1–2 g/m$^2$.

Another feature of the invention resides in the provision of a method of making a flexible laminate. The method comprises the steps of equalizing an uneven side of a substrate which consists of or contains leather including applying to the substrate a coating having a plurality of superimposed layers including an outer layer and an inner layer which latter equalizes (at least in part) the uneven side of the substrate and is disposed between the substrate and the outer layer. The method can be carried out in such a way that the inner layer is applied to the uneven side of the substrate in a first step and the outer layer is applied to the already applied inner layer in a next-following step.

The inner layer of the coating can be made of a material which is liquefiable (flowable) in response to heating, and the step of applying the inner layer can include spraying the material of the inner layer in liquefied condition onto the uneven side of the substrate and/or onto the outer layer. The spraying step can include discharging the liquefied material of the inner layer from the orifices of one or more spray nozzles. Alternatively, the material of the inner layer can be heated and thereupon rolled onto the uneven side of substrate. Still further, the material of the inner layer can be in the form of a dispersion which is applied to the uneven side of the substrate and/or to the respective side of the outer layer, and the evaporable fraction (e.g., water) of the dispersion is thereupon caused or permitted to evaporate. Still further, it is possible to apply the inner layer in a pulverulent state to the uneven side of the substrate and/or to the respective side of the outer layer of the coating.

If the inner layer contains or consists of a polyurethane resin, the step of applying the inner layer can include heating the resin and applying the heated resin to the uneven side of the substrate and/or to the respective side of the outer layer. The inner layer can contain polyamide, a polyester resin and/or a number of other suitable equalizing materials. As mentioned above, the weight of the inner layer can be in the range of 20 to 25 grams per square meter if the one side of the substrate is relatively smooth. Alternatively, the weight of the inner layer can be in the range of 25 to 40 grams per square meter, for example, if the substrate is a pigskin which, as a rule, exhibits or is likely to exhibit rather pronounced unevennesses. The inner layer can have the same weight if the outer side of the substrate has reasonably pronounced unevennesses and anticipated damages in the form of scars or the like. If the substrate is a skiver, the weight of the inner layer can be selected to be in the range of 40 to 50 grams per square meter.

It is presently preferred to thermally bond the inner layer of the coating to the uneven side of the substrate. The bonding step can include heating the material of the inner layer to a temperature of approximately 120° C. and pressing the heated material of the inner layer against the uneven side of the substrate for a period of approximately 8 seconds. The interval of bonding can be reduced to between 4 and 5 seconds if the temperature of the inner layer is raised to approximately 125° C., and such interval can be reduced to about 3 seconds if the inner layer is heated to approximately 130° C. The application of the inner layer to the substrate is or can be the result of the application of heat and pressure.

At least one layer of the coating can be profiled, particularly embossed (e.g., with assistance from the aforementioned platen), in the course of applying the outer layer and/or the inner layer to the substrate. Such profiling can be carried out through the carrier for the coating, i.e., prior to transfer of the coating from the carrier to the uneven side of the substrate. The layers of the coating can be applied to the carrier individually; thus, the outer layer is applied to the carrier in a first step and the inner layer is thereupon applied over the outer layer so that it can be brought into contact with the uneven side of the substrate. The aforementioned separating layer or agent between the carrier and the outer layer of the coating ensures that the carrier can be readily separated from the outer layer upon completion of application of the coating to the substrate.

If the outer layer comprises two or more superimposed strata, the outer stratum of such composite outer layer can include a lacquer. Furthermore, the outer stratum can exhibit satisfactory or highly satisfactory grip-enhancing (antiskid) characteristics. The outer stratum of the composite outer layer of the coating can contain, or consist of, cellulose acetate butyrate.

If the material of the inner layer is liquefiable (flowable) in response to heating, the outer layer can be separably applied to one side of the sheet- or web-like carrier, and the liquefied material of the inner layer is sprayed onto the outer layer on the carrier. The step of applying the coating to the substrate follows thereafter, i.e., the two layers are transferred from the carrier onto the substrate so that the inner layer is adjacent the uneven side of the substrate. If desired, the material of the inner layer can be heated prior to contacting the outer layer, and the thus heated material of the inner layer is then rolled onto the outer layer before the two layers are applied to the substrate. If the material of the inner layer is liquefiable, it can be sprayed onto the outer layer on the carrier prior to application of the coating to the substrate. If the material of the inner layer is dispersible in water or in another evaporable medium, the dispersion is applied to the outer layer and/or to the uneven side of the substrate prior to application of the outer layer to the substrate. Pulverulent material of the inner layer can be applied to the outer layer and/or to the substrate before the outer layer is applied to the substrate. The carrier of the outer layer is separated from the laminate upon completion of the transferring step, i.e., when the layers of the coating are applied to the substrate and adhere to each other and to the substrate with a force which warrants separation of the carrier from the outer layer of the coating on the substrate.

A further feature of the invention resides in the provision of an apparatus for making a flexible laminate wherein a multi-layer coating is applied to an uneven side of a substrate which consists of or contains leather. The apparatus comprises at least one press having a support men, her and a ram member. The two members define a space or gap for a succession of substrates and coatings, and the two numbers are arranged to apply the coatings to the respective substrates in response to the application of heat and/or pressure. The apparatus can further comprise means for conveying the coatings and the substrates of the succession into the space or gap; such conveying means can comprise the aforementioned sheet- or web-like carrier.

The apparatus can further comprise a source of carrier material, such as a supply reel at one side of the space or gap, and means for collecting the web at the other side of the space or gap. The collecting means can comprise a rotary takeup reel.

The apparatus can also comprise means for heating the ram men%her and/or the support member. At least one of the members can be provided with a smooth surface which faces the other member across the space or gap between the two members. Alternatively, at least one of the members can include or carry an embossing or profiling portion (such as the aforementioned platen) which faces the other member across the space or gap between the two members. At least one of the members can constitute a roll, such as a calender roll, with a smooth or embossed and/or otherwise profiled peripheral surface.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
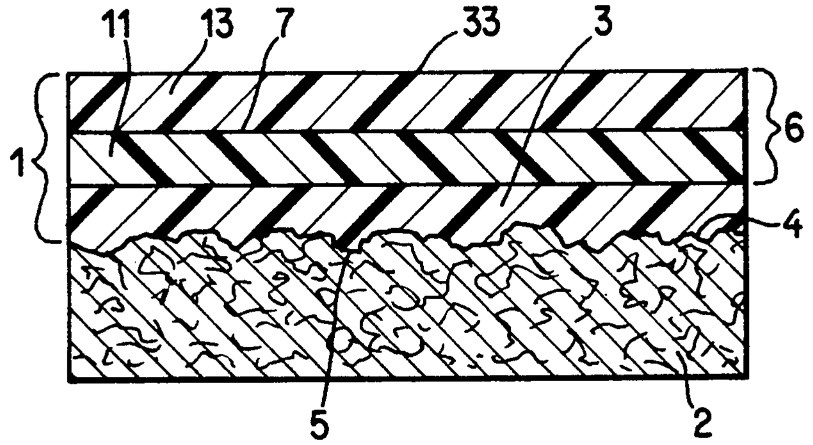
FIG. 1 is a schematic sectional view of a flexible laminate which embodies one form of the invention and wherein the outer layer of the coating for the substrate of leather has two superimposed strata.

FIG. 1 shows in section a portion of a flexible laminate which includes a substrate 2 consisting of leather and having an uneven side 4 (the unevennesses are exaggerated in FIG. 1 for the sake of clarity), and a coating 1 which is composed of an inner layer 3 adjacent the uneven side 4 of the substrate 2 and an outer layer 6 composed of two superimposed strata including an inner stratum 11 adjacent the layer 3 and an outer stratum 13 with an exposed surface 33. That surface of the coating 1 which is adjacent the substrate 2 closely conforms to the uneven side 4 of the substrate, i.e., the material of the inner layer 3 fills the recesses, grooves, furrows, cracks, scratches and/or other unevennesses 5 in the side 4. The inner layer 3 of the coating 1 can be called a leveling or equalizing layer which can contain one or more pigments so that it actually hides the uneven side 4 of the substrate 2 even if the outer layer 6 including the strata 11 and 13 transmits light. The reference character 7 denotes in FIG. 1 that surface of the inner layer 3 which is bonded to the adjacent inner surface of the inner stratum 11 of the outer layer 6.

The material of the inner layer 3 can be applied to the uneven side 4 of the substrate 2 and/or to the inner stratum 11 of the outer layer 6 in the form of a powder, paste or liquid. For example, the material of the inner layer 3 can be a thermoplastic substance which is liquefiable (flowable) in response to heating and is applied in liquefied state by means of brushes, spray nozzles or the like. Still further, the material of the inner layer 3 can be dispersed in water or in another evaporable liquid, and the dispersion is applied to the inner stratum 11 and/or to the uneven side 4 of the substrate 2 before the liquid fraction is caused to evaporate so that the remaining fraction or fractions of the dispersion form the inner layer 3. Still further, the inner layer can be applied to the inner stratum 11 and/or to the side 4 of the substrate by a roll or another spreading device which distributes a mass of paste-like or other viscous or highly viscous material prior to the application of heat and/or pressure in order to bond the thus formed inner layer to the substrate 2 as well as to the outer layer 6. If the material of the inner layer 3 is a hotmelt, such material is applied to the uneven side 4 of the substrate 2 and/or to the inner layer 11 and is thereupon activated to establish a reliable bond between the substrate and the outer layer.

The multi-stratum outer layer 6 can be replaced with a single layer without departing from the spirit of the invention. The outer stratum 13 can contain a suitable coloring agent (e.g., one or more pigments). For example, the outer stratum 13 can constitute a film of polyurethane lacquer. However, it is equally possible to provide an outer stratum 13 which consists of or contains an acrylic resin, a polyamide or an acetic butyrate.

The substrate 2 can be made of a skiver or of any other leather including pigskins, cowhides, goatskins, sheepskins and/or the skins of other animals which are or can be processed into leather. The improved flexible laminate can employ substrates which exhibit pronounced blemishes or undesirably produced grains such as would normally detract from the value of such leathers on account of their appearance and/or for other reasons. The material of the inner layer 3 can be readily selected in such a way that it equalizes the uneven side 4 of a low-quality or damaged substrate 2 so that the resulting laminate can be put to use for the making of expensive high-quality leather products.

Figure 2:
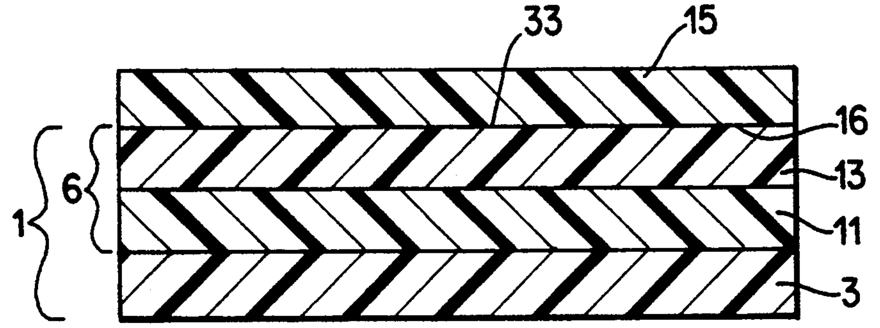
FIG. 2 is a sectional view of a flexible carrier for a coating prior to application of the inner layer of the coating to a substrate.

FIG. 1 shows that the inner layer 3 and the strata 11, 13 of the outer layer 6 are applied directly to the uneven side 4 of the substrate 2. However, it is equally possible (and often preferred) to apply the two layers of the coating 1 first to a flexible carrier (such as the flexible carrier 15 which is shown in FIG. 2) and to thereupon transfer the resulting coating to the uneven side of a substrate which consists of or contains leather. The carrier 15 (which can include a sheet, strip or web of paper, plastic foil or the like) is shown in FIG. 2; one side 16 of this carrier contacts but is separable from the adjacent outer surface 33 of the outer layer. Still further, the outer layer can be applied to the side 16 of the carrier 15, the inner layer 3 can be applied to the uneven side of a substrate, and the outer layer is thereupon transferred from the carrier 15 onto the inner layer on the substrate.

Figure 3:
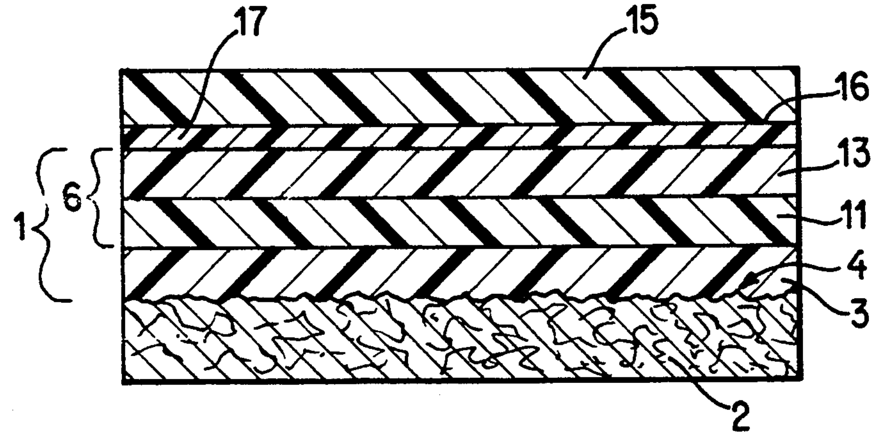
FIG. 3 is a schematic sectional view of a substrate, of a coating, of a carrier for the coating, and of a separating layer between the carrier and the outer layer of the coating.

FIG. 3 shows that the flexible laminate can further comprise a separating layer 17 which is interposed between the side 16 of the carrier 15 and the surface 33 of the outer stratum 13 of the outer layer 6 to serve as a means for facilitating convenient and predictable separation of the carrier 15 from the outer layer 6 when the transfer of the coating 1 including the layers 3 and 6 onto a substrate 2 is completed. For example, the layer 17 can consist of so-called separating or stripping lacquer.

The carrier 15 can be made of a plastic foil, such as a foil which consists of or contains a polyester, polyvinyl chloride or polyethylene. As mentioned above, it is equally possible to make the carrier 15 of paper; in fact, it is also possible to employ a metallic material, such as an aluminum foil or sheet. Still further, it is possible to employ a multilayer carrier with one layer made of a metallic and with another layer made of a plastic material.

The outer layer 6 of the coating for the substrate 2 can be made of a colorless (fully transparent) or colored material which can be translucent or opaque. Furthermore, the exposed surface 33 of the outer layer 6 can be provided with a finish which imparts to it antiskid (grip-enhancing) characteristics. This can be achieved by appropriate selection of the material of the outer layer 6 and/or by imparting to the surface 33 a certain profile, e.g., in the form of alternating hills and valleys, grooves, channels, regularly or irregularly distributed furrows and/or others.

The sides of the carrier 15 may but need not be flat. For example, at least the side 16 of the carrier 15 can have a profile which is to be imparted to the surface 33 of the outer layer 6 in order to enhance its appearance and/or its antiskid characteristics. Furthermore, at least the side 16 of the carrier 15 can be profiled in imitation of the uneven side of a piece of leather, such as the leather obtained from the skin of an ostrich, pigskin, goatskin, sheepskin, cowhide, calfskin or others. For example, a carrier 15 which contains or consists of a sheet or web of paper can be readily embossed to acquire a surface finish which matches or resembles that of a particular type of leather. If the carrier 15 of FIG. 3 is a paper sheet or web, the separating layer 17 can consist of or can contain silicone.

Figure 4:
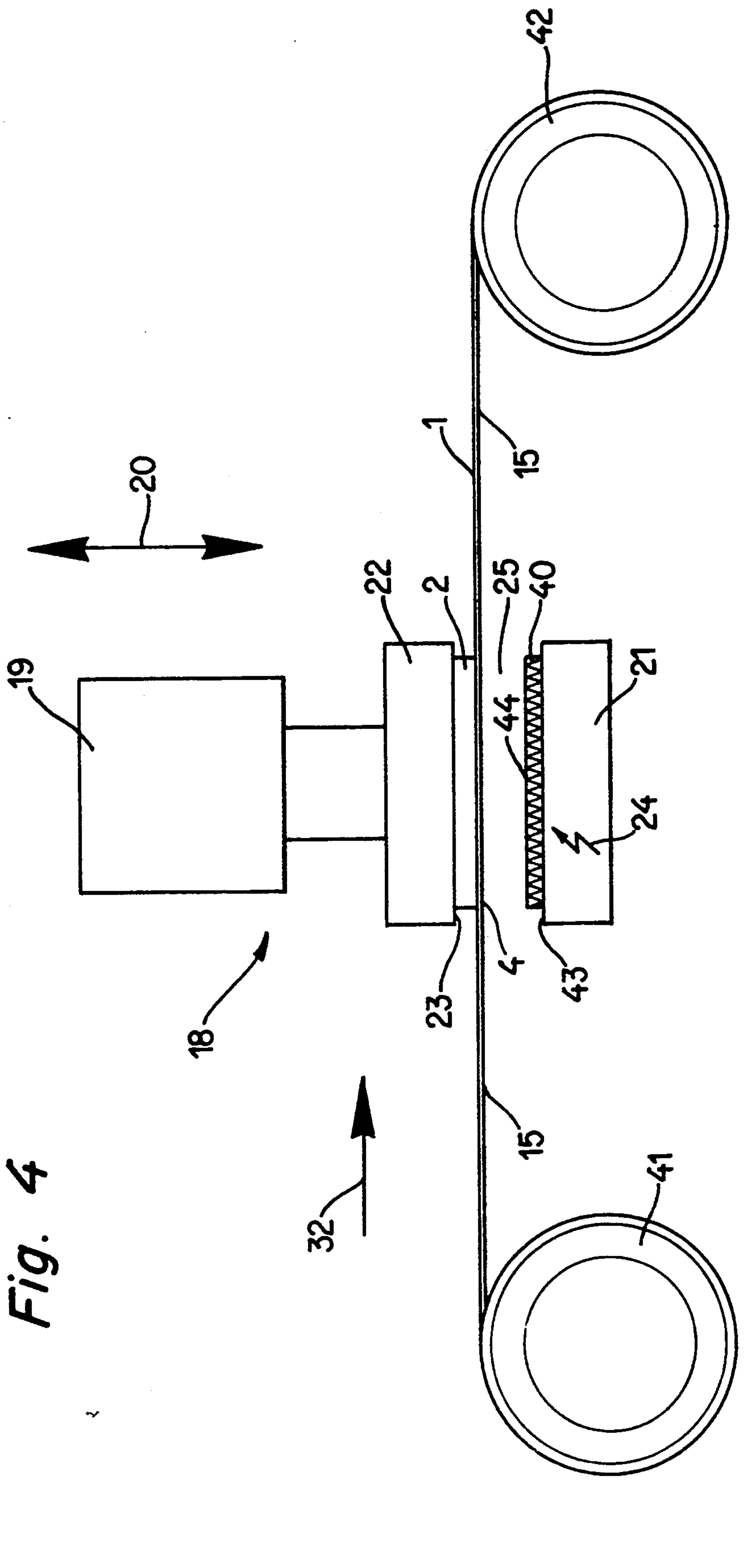
FIG. 4 is a schematic elevational view of an apparatus which can be used for the practice of the improved method and is constructed and assembled in accordance with a first embodiment of the invention.

FIG. 4 shows certain parts of an apparatus which can be used for the practice of the improved method, i.e., for the making of flexible laminates of the type shown in FIGS. 1, 2 and 3. The apparatus comprises a press 18 with a support or anvil 21 at one side and a reciprocable ram 22 at the other side of the path for an elongated web- or strip-shaped carrier 15 which is supplied by a first reel 41 and is collected by a takeup reel 42. The reels 41 and 42 are disposed at opposite sides of the space or gap 25 between the support 21 and the ram 22. The directions in which the ram 22 is movable by the motor 19 of the press 18 are indicated by an arrow 20. The underside of the ram 22 constitutes a smooth surface 23 which abuts the rear side of the substrate 2, namely that side which need not be provided with a coating 1. The latter is applied to the carrier 15 so that its inner layer (not identified in FIG. 4) faces upwardly and can contact the uneven side 4 of the substrate 2 in the space or gap 25. The smooth upper side or surface 43 of the support 21 carries a preferably exchangeable embossing tool in the form of a platen 40 having an upper side 44 which can shape the adjacent side of the carrier 15 and hence the surface 33 of the outer layer 6 of the coating 1 on the carrier. The latter is driven intermittently in the direction of arrow 32, e.g., by a motor which is coupled to the core of the takeup reel 42.

The support 21 and/or the ram 22 contains one or more heating elements for one or more components of the coating 1. FIG. 4 shows schematically a heating element 24 which is installed in or on the support 21.

The coating 1 can be applied to the carrier 15 before the carrier is stored on the core of the supply reel 41. Alternatively, the outer layer 6 can be applied to the upper side of the carrier 15 between the supply reel 41 and the space 25, and the application of outer layer 6 can be followed by application of the inner layer 3 between the locus for the application of outer layer and the space 25. Still further, the outer layer 6 can be applied to the carrier 15 and the inner layer 3 can be applied directly to the uneven side 4 of the substrate 2 which can be attracted to the underside of the ram 22 by suction or in any other suitable way. The separating layer 17 is applied to the carrier 15 prior to deposition of the outer layer 6 on the carrier.

When an intact portion of the coating 1 enters the space 25 and the ram 22 attracts a substrate 2, the motor 19 lowers the ram 22 to press the underside of the carrier 15 against the profiled surface 44 of the platen 40 so that a replica of the profile of the surface 44 is transferred onto the carrier and hence to the adjacent surface 17 of the outer layer 6. The heating element 24 establishes the necessary temperature (e.g., 120° C., 125° C., 130° C. or 140° C., depending on the length of the interval of dwell of the ram 22 in its lower end position) which suffices to ensure that the inner layer 3 of the coating 1 equalizes the side 4 of the substrate 2 and that the inner layer is properly bonded to the substrate. The pressure which is applied by the ram 22 can be in the range of 20 to 50 kiloponds per square centimeter. The exact pressure will depend on the nature of the substrate, on the nature of the material of the inner layer 3, on the desired quality of the profile which is imparted by the platen 40, and on certain other parameters. As a rule, the interval of application of pressure to the coating 1 in the space 25 is between 3 and 8 seconds but can be longer or shorter, depending on the nature of materials which form the coating 1. This interval is selected with a view to prevent excessive heating of the substrate 2 in the space 25 while enabling the heating element 24 to raise the temperature of the inner layer 3 to a value which is required for adequate bonding of the inner layer to the uneven side 4 of the substrate 2.

As already mentioned above, the material of the inner layer 3 can be in a pulverulent state prior to compression of the coating 1 in the space 25. If the nature of the material of the inner layer is such that it can be more readily applied in a liquid or liquefied state, the readily flowable non-pulverulent material can be applied in the form of a film to the uneven side 4 of the substrate 2 and/or to the adjacent surface of the outer layer 6. Polyurethane is one of the presently preferred materials for the making of the inner layer 3. Such material can be heated to requisite temperature prior to its application in liquefied condition, and the thus applied film or films are then caused or permitted to set, with or without the influence of moisture in the surrounding air.

Selection of the material which forms the inner layer 3 will depend on a number of factors. For example, the material of the inner layer will be selected to ensure that the inner layer will be reliably bonded to the selected substrate 2. Moreover, the material of the inner layer 3 will influence the flexibility and/or other characteristics of the laminate and/or of the outer layer 6. If the uneven side 4 of the selected substrate 2 is relatively smooth, the thickness of the inner layer 3 will be selected in such a way that it will weigh between 20 and 25 grams per square meter. If the side 4 of the selected substrate 2 exhibits pronounced unevennesses and further exhibits defects which are to be expected in the course of normal handling of skins, the weight of the inner layer will be between 25 and 40 grams per square meter. For example, the quality of pigskin can be improved by applying an inner layer having a thickness such as to weigh between 25 and 40 grams per square meter. On the other hand, a normal or average skiver with pronounced blemishes in the form of furrows, scratches and others will normally carry an inner layer of a thickness such that the weight of the inner layer is 40 to 50 grams per square meter.

The pressure which the ram 22 applies to the inner layer 3 by way of the substrate 2 will depend on the selected temperature of the support 21 and on the composition of the inner layer. Satisfactory results were obtained at temperatures in the range of 120°, 125° and 130° C. when the intervals of application of pressure were respectively in the range of 8, 4–5 and 3 seconds. The pressure is preferably not less than 20 kiloponds per square centimeter.

Remnants of the separating layer 17 (such as silicone) which is used between the carrier 15 and the outer layer 6 to facilitate predictable separation of the carrier downstream of the laminating station can be used to enhance the antiskid and/or other properties of the exposed surface 33 of the outer stratum 13 of the outer layer 6. A suitable lacquer constitutes one of the presently preferred separating or separation promoting layers between the outer layer 6 of the coating 1 and the adjacent side 16 of the carrier 15. The outer layer 6 can include an outer stratum 13 which contains one or more suitably distributed pigments which enhance the appearance of the improved laminate. Furthermore, the surface 33 of the outer stratum 13 can be treated with an embossing roll or in any other suitable way to impart thereto a profile or texture which contributes to the eye-pleasing appearance of the laminate. The separating layer 17 is then applied over the thus treated surface 33 of the outer stratum 6 before the latter is attached to the side 16 of the carrier 15 for transport toward and into the space 25 between the ram 22 and the support 21 of the press 18. The outer stratum 13 or the entire outer layer 6 can be a unicolored or a multicolored body. The outer layer 6 can be rolled onto or applied to the carrier 15 with a brush. Other known methods can be relied upon with equal or similar advantage, depending upon the materials of the separating layer 17 and outer stratum 13, on the aggregate state of the material of the outer layer 6 prior to its application to the carrier 15 and the separating layer 17, and on the facilities which are available in a particular plant.

The inner layer 3 can be painted, rolled or extruded onto the inner stratum 11 of the outer layer 6 and/or onto the uneven side 4 of the selected substrate 2. As already explained above, a dispersion which is to form the inner layer 3 can be applied with a brush or by resorting to one or more nozzles. The liquid fraction of the dispersion is thereupon caused or permitted to evaporate. The nature of the material of the inner stratum 11 of the outer layer 6 will be selected with a view to ensure that the inner layer 3 will properly adhere to the outer layer. A nozzle of the type used for application of readily flowing or viscous liquids can be used with particular advantage to ensure predictable and rapid application of the material of the inner layer 3 to the inner stratum 11 of the outer layer 6 and/or to the uneven side 4 of the substrate 2. A viscous or highly viscous material of the inner layer 3 can be rolled onto the substrate 2 and/or onto the outer layer 6 on the carrier 15.

If the exposed surface 17 of the outer layer 6 on the finished laminate should be smooth, the platen 40 will be removed so that the underside of the carrier 15 will be acted upon by the smooth surface 43 of the support 21. The smooth surface 23 of the ram 22 can impart a desired finish to the exposed side of the substrate 2 in the space or gap 25. In fact, the smooth surface 23 of the ram 22 can also influence the shape of the exposed surface 17 of the outer stratum 13 of the outer layer 6 of the finished laminate. Smooth surfaces 33 are desirable in connection with the making of patent leather.

On the other hand, if the operator wishes to impart to the surface 33 a specific profile which departs from a smooth finish, the platen 40 is placed onto the surface 43 of the support 21 in order to shape the surface 33 by way of the carrier 15 which is sufficiently deformable to enable the profile 44 of the platen 40 to impart to the surface 33 of the outer layer 6 a complementary profile, e.g., a profile resembling that of a particular type of leather. The apparatus of FIG. 4 can be furnished with an entire battery of platens 40 each of which can be provided with two different profiles 44 so as to enable the operator to select the desired one of a plurality of different shapes or profiles for the exposed surface 33 of the outer layer 6 forming part of a finished laminate. If the surface 33 is to be provided with a very pronounced profile, e.g., in imitation of ostrich skins or alligator or crocodile skins, the application of such pronounced profile to the surface 33 can be carried out in two or more successive passes with different platens 40 or with different sides of one and the same platen. Alternatively, the illustrated press 18 can be followed by a second press (not shown in FIG. 4) which can be identical with or similar to the press 18. The first press (nearer to the supply reel 41) is then used to adequately bond the inner layer 3 to the substrate 22, and the second press is used subsequent to separation of the carrier 15 from the resulting laminate so that the profile 44 of a platen on the support of the second press can bear directly upon the surface 33 of the laminate which has been transferred from the first press. The platen 40 can be omitted if the coating 1 is carried by a profiled carrier 15 (e.g., a paper carrier) which can retain its profile during treatment in the space 25 so that an image of the profile on the carrier is applied to the surface 33 of the outer layer 6. The profile of the carrier can be such that the surface 33 of the finished laminate is smooth, pockmarked or otherwise shaped, depending upon the desired use of the laminate.

If the carrier 15 of FIG. 4 supports only the outer layer 6, i.e., if the inner layer 3 is applied directly to the uneven side 4 of the substrate 2, the action of the heating element 24 must be adequate to ensure that it is felt by the material of the inner layer 3 on the substrate. The material of the inner layer 3 assumes a pasty consistency and the material of the inner layer thereupon flows in response to the application of a pressure in the range of 40 to 80 kiloponds per square centimeter. This causes the readily flowing material of the inner layer 3 to penetrate into and to completely or practically completely fill the recesses in the side 4 of the substrate 2 so as to equalize or make even the underside of the substrate. This involves a filling of recesses which are characteristic of leathers of the type selected for the substrate as well as any other unevennesses such as those which are attributable to damage to the substrate prior to and/or subsequent to processing of a skin into leather. Moreover, as the material of the inner layer 3 softens in response to the application of requisite temperature and/or pressure, the inner layer assists the platen 4 and its profile 44 in applying a complementary profile to the surface 33 of the outer layer 6. As stated above, the platen 40 can be omitted if the side 16 of the carrier 15 is adequately profiled to ensure a desirable profiling of the exposed surface 33 of the outer layer 6 which forms part of the finished laminate.

The quantity of material which is to form the inner layer 3 is preferably selected in such a way that the material fills the recesses in the uneven side 4 of the substrate 2 as well as that a surplus of material remains adjacent the lowermost points of the uneven side 4 so that the lowermost part of the inner layer 3 can form a continuous film all the way along the adjacent inner surface of the outer layer 6. Thus, one preferably operates with a certain surplus of material which is to form the inner layer 3, i.e., such material is applied in quantities exceeding those which are absolutely necessary to merely fill the recesses in the adjacent side 4 of the substrate.

When the bonding of the coating 1 to the substrate 2 is completed, the carrier 15 is separated from the thus obtained laminate and the latter is detached from the ram 22 so as to provide room for a further substrate which is caused to adhere to the underside of the ram 22 while the aforementioned prime mover for the takeup reel 42 advances the carrier 15 by a step so as to place a fresh portion of the outer layer 6 or a fresh portion of the coating 1 at the upper side of the carrier 15 into register with the uneven side 4 of the freshly introduced substrate.

It is further within the purview of the invention to operate without a carrier, i.e., to assemble a coating consisting of layers 3 and 6 and to place such coating between the ram 22 and the support 21. It is also possible to dispose the ram 22 at a level below the support 21 and to change the orientation of the reels 41, 42 so that the coating 1 or the outer layer 6 is located at the underside of the carrier portion between the two reels.

Figure 5:
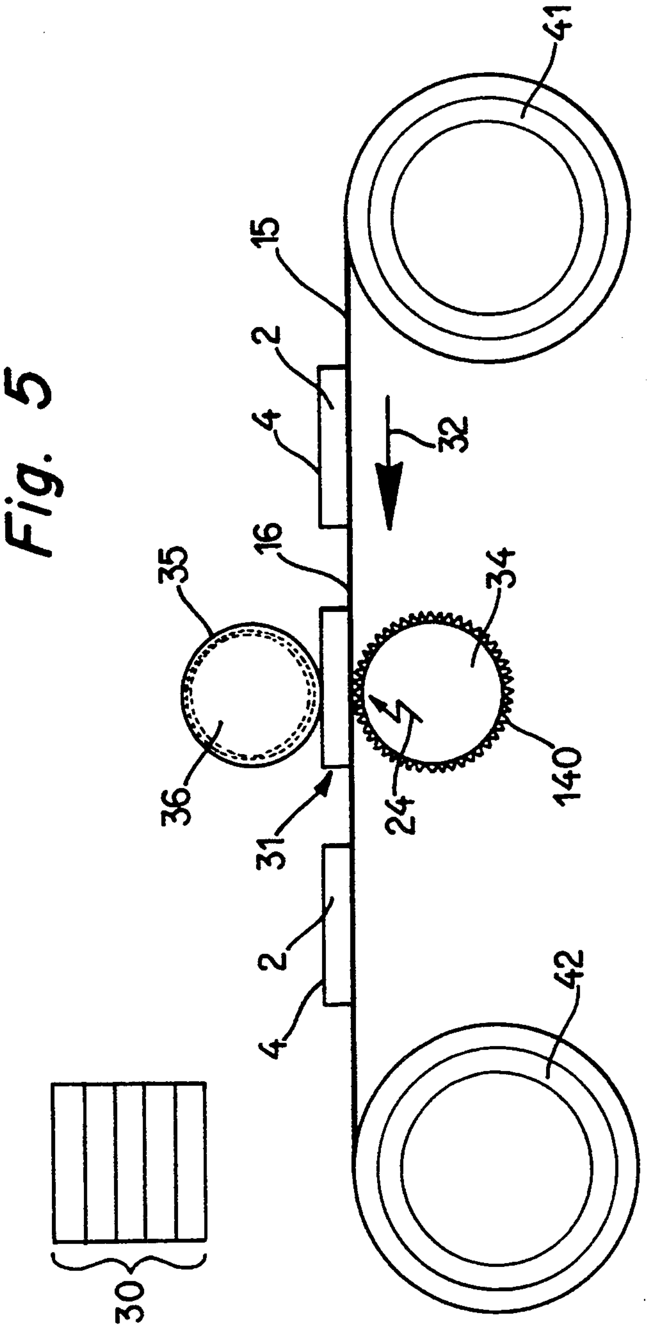
FIG. 5 is a similar schematic elevational view of a modified apparatus wherein the coatings are bonded to the substrates in the nip of two rolls.

FIG. 5 shows a modified apparatus which is actually a calender with a first roll 36 which replaces the ram 22 of FIG. 4 and a second roll 34 which replaces the support 21. The roll 34 is heated, as at 24, and has a preferably removable shell 140 constituting a cylindrical platen serving the same purpose as the platen 40 in the apparatus of FIG. 4. The upper roll 36 is provided with a coating 35 which includes the materials of the inner and outer layers 3 and 6. The carrier 15 supports a series of preferably equidistant or substantially equidistant substrates 2 whose uneven sides 4 face upwardly and are provided with coatings during travel through the nip 31 of the rolls 34 and 36. The carrier 15 is paid out by a supply reel 41 and is collected by a takeup reel 42. A stack of substrates 2 can be maintained close to the laminating station for manual or automatic delivery to the upper side 16 of the carrier 15 between the supply reel 41 and the rolls 34, 36. The height of the nip 31 of the rolls 34, 36 is selected in such a way that successive substrates 2 and the adjacent portions of the coating 35 are converted into laminates during travel of substrates from the supply reel 41 toward the takeup reel 42. Finished laminates can be removed by hand or automatically and stacked at 30 for transport to the next processing station. The purpose of the profiled cylinder 140 on the lower roll 34 is primarily to ensure that the web-like carrier 15 is properly advanced through the nip 31 as well as that the substrates 2 are compelled to advance through the nip at the peripheral speed of the rolls 34 and 36. The speed of each of the rolls 34, 36 is selected in such a way that the period of dwell of successive increments of an advancing substrate 2 in the nip 31 suffices to ensure that the inner layer 3 of the coating is adequately bonded to the uneven side 4 of such substrate as well as that the material of the inner layer fills the recesses in the uneven side 4. Thus, if the inner layer 3 consists of or contains a thermoplastic material, it must be heated to a temperature at which it is sufficiently soft to perform its intended functions of filling the recesses in the uneven side 4 of a substrate 2 and of establishing a reliable bond between the substrate and the coating.

If the inner and outer layers are placed onto the substrates 2 before such substrates enter the nip 31 (e.g., if the layers 3 and 6 are applied to the upper side 16 of the carrier 15), the outer layer 35 on the roll 36 simply constitutes a cylindrical film or shell which ensures that the substrates 2 do not adhere to the roll 36 during travel through the nip 31.

The manner in which the laminates are processed upon removal from the apparatus which is shown in FIG. 4 or 5 forms no part of the present invention. Such laminates can be used for the making of a variety of high-quality expensive leather products.

If desired or necessary, the apparatus of FIG. 4 or 5 can be rapidly converted for the making of different laminates. All that is necessary is to replace one type of substrates with another type and/or to apply to the substrates different coatings. Such ability of the apparatus to be rapidly converted for the making of different types of laminates is important if one and the same apparatus is to turn out relatively short series of laminates of different types.

An important advantage of the improved laminate is that its appearance can depart considerably from the appearance of the substrate. Thus, the substrate can impart to the laminate certain desirable properties (such as flexibility, resistance to tearing, ability to accept stitches and/or nails and many others), and the coating 1 can enhance the appearance of the product by imparting thereto a desired color, finish, profile, thickness and/or a combination of these. The appearance of the laminate can greatly depart from that of the selected substrate, and the coating can fully conceal the flows in the uneven surface 4 of the substrate. If desired, the coating 1 can be designed to exhibit artificial flaws in the form of furrows, ridges and/or other configurations which are typical of certain types of leathers such as alligator skins or crocodile skins. By way of example, a laminate which contains a substrate of pigskin can be designed to resemble a high-quality cowhide or goatskin. As a rule, the coating 1 does not adversely affect the desirable properties (such as flexibility and others) of the selected substrate; in fact, the coating can be selected in such a way that it even enhances the flexibility and/or the ability of the laminate to resist tearing and/or puncturing.

Another important advantage of the improved laminate is its low cost. The coating 1 can be applied to a selected substrate in a relatively simple, compact and inexpensive apparatus which can be rapidly converted for the making of different types of laminates regardless of whether the user of the apparatus wishes to turn out short or long series of identical laminates. For example, the apparatus can be set up to make laminates which can be used as high-quality patent leathers with a glossy exposed surface 33. The improved apparatus is simpler and less expensive than conventional apparatus for the making of patent leathers wherein hardening of the applied coats must take place with total exclusion of dust and other contaminants. If the improved laminate is to be used as patent leather, the inner layer 3 serves to establish a bond between the coating 1 and the substrate 2 as well as to provide a smooth surface 7 for the adjacent inner stratum 11 of the outer layer 3.

The multilayer coating 1 exhibits a number of important advantages. Thus, the material of the inner layer 3 can be selected with a view to ensure that all unevennesses 5 in the side 4 of the substrate 2 are filled and that the outer layer 6 adheres to the substrate regardless of the extent of flexing and/or other deformation of the laminate. On the other hand, the material of the outer layer 6 can enhance the appearance of the laminate and/or the resistance to scratching, to prevent the penetration of moisture into the laminate and into contact with the substrate and/or to enhance the feel (such as the antiskid properties) of the laminate. This is in contrast with heretofore known proposals to apply coatings to substrates which consist of leather.

The inner layer 3 can perform the additional important function of concealing the blemishes of the uneven side of the substrate, not only as a result of filling the unevennesses but also because it can prevent the penetration of light to the substrate so that the appearance of the laminate is determined primarily or exclusively by the coating. This renders it possible to use low-grade substrates for the making of laminates which can be used in lieu of top-quality skins for the making of expensive leather goods. The layers 3 and 6 can protect the substrate from moisture to thus prolong the useful life of the substrate and hence the useful life of the entire laminate. Still further, the coating can be selected with a view to resist solvents which could affect the appearance and/or the useful life of the substrate. If desired, the smoothness of the exposed surface of the outer layer can greatly exceed that of the uneven surface of the respective substrate.

The carrier 15 constitutes an optional but desirable part of the means for making the improved laminate. An advantage of the carrier is that it can be provided with a coating or with an outer layer at a first location and is thereupon convoluted and transferred to the locus of one or more presses where the coating is applied to successive substrates. For example, the press or presses can be set up in a developing country, and rolls of carriers with the coatings already applied thereto can be imported from a highly industrialized country wherein the application of coatings to the carriers can be effected at a lower cost and in machinery which might not be available in a developing country. This renders it possible to ensure that at least a substantial part of the method of making the improved laminate can be carried out in the country which furnishes the substrates. In fact, the apparatus for transferring coatings from carriers onto substrates of leather can be similar to many existing apparatus which are used in skin tanning and other skin processing plants. Thus, the application of coatings to substrates can be carried out in a country which does not as yet have facilities and/or personnel to set up, maintain and operate reasonably complex or highly complex machinery such as may be necessary for the application of a variety of coatings to substrates of paper or plastic material. This obviates the need for qualified foreign specialists who are capable of servicing complex machinery for the application of coatings to flexible carriers, and reduces the likelihood of prolonged idleness of special machines due to lack of qualified labor.

An operator in charge of a relatively simple apparatus of the type shown in FIGS. 4 and 5 must merely ensure that at least one of the parts 21, 22 or 34, 36 is adequately heated and that the interval of application of heat to the components of the coating which is to be applied to a substrate will be sufficiently short to prevent damage to (e.g., hardening of) the substrate as a result of prolonged heating to an elevated temperature. The apparatus can turn out a large number of laminates per unit of time, even if the substrates are fed individually and by hand.

An important advantage of the flexible laminate as claimed is that it can render useful a number of substrates which consist of low-grade and/or damaged leather, for example, leather one side of which exhibits pronounced damage in the form of deep scratches or the like. Moreover, and in contrast to the proposal of Connett, the improved flexible laminate retains the desirable characteristics (such as softness and absence of brittleness) of leather, i.e., it remains a leather but the defects of the original substrate are eliminated and/or fully concealed and its appearance can be selected practically at will. An important reason is that, in contrast to prior proposals, the defects of the damaged side of the substrate are eliminated in that they are filled in by the material of the inner layer of the coating. The outer layer is used to enhance the appearance of the thus repaired side of the substrate. The thickness of the inner layer should preferably suffice to eliminate any unevennesses in the adjacent side of the substrate but the thickness of such inner layer along the non-defective portion of the substrate should be or can be minimal or negligible so as not to detract from the desirable characteristics of leather. Thus, the undamaged portion of the substrate should be free to breathe; such desirable characteristic of leather is greatly affected by a relatively thick layer of plastic material at the scarred side of the substrate. This is in direct contrast to the teaching of Connett who proposes to apply to the substrate a cross-linked layer of plastic material having a fixed thickness.

The non cross-linked material of the inner layer of the coating forming part of the improved flexible laminate flows into the unevennesses at one side of the substrate from a distance of 50 mm so that the unevennesses are filled and the initially scratched and/or otherwise scarred side of leather substrate becomes smooth. The thickness of the inner layer on the undamaged portion of the one side of the substrate is very small and is needed only to ensure the establishment of a satisfactory bond between the substrate and the outer layer of the coating. For example, the thickness of the inner layer at the undamaged portion of the adjacent side of the substrate can be in the range of 1 micron or a few microns. Therefore, such extremely thin inner layer does not adversely influence the desirable properties of the substrate.

The application of optimal temperatures is also important for the practice of the improved method, i.e., for the making of a high-quality flexible laminate having a substrate of low-grade and/or damaged leather. If the substrate is heavily damaged, the non cross-linked material of the inner layer must cover a considerable distance on its way into a scratch, a crack or the like; therefore, such material must be adequately heated for a reasonably long interval of time. Damage to the substrate is avoided by maintaining the temperature at a relatively low value (110°–130° C.), e.g., at 120° C. for an interval of approximately 8 seconds. Such interval normally suffices to ensure that the flowable material of the inner layer finds its way into and completely fills any cracks and/or other recesses in the damaged side of the substrate.

If the damage is not very pronounced, the application of heat can take place for a shorter interval of time and the temperature can be raised (e.g., to 130° C.) because it is being applied during a shorter interval. Thus, a leather substrate can stand temperatures of 130° C. if the interval of application is relatively short, e.g., not more than 3 seconds. The application of heat is terminated before the substrate can take up heat in quantities which would be damaging to the appearance and/or other characteristics of leather. This is in direct contrast to the teaching of Connett who proposes to operate at temperatures of 150°–200° C. and to employ a non-flowable (cross-linked) plastic layer of constant thickness.

The dry thickness of the inner layer is also selected in dependency on the nature of damage to and/or defects in the substrate. If the damage is pronounced, the dry thickness of the inner layer can be as high as 50 gr/m$^2$. On the other hand, the dry thickness can be as low as 15 g/m$^2$ if the damage to the substrate is relatively minor. Other (intermediate) dry thicknesses will be selected if the damage is neither minor nor very pronounced.

It is to be borne in mind that abrupt transition from a solid state to a state of pasty consistency will take place if one deals with non cross-linked thermoplastic substances. Thus, as the temperature rises to a certain value, such substances will undergo an abrupt transition from solid state to pasty consistency. On the other hand, such substances should be given adequate time to penetrate into scratches, cracks or the like from a distance of normally not more than 50 mm. The required temperature is above 100° C. (which is often applied in connection with the making of footwear from leather). As already mentioned above, leather will stand temperatures of up to 130° C. (if not applied for extensive intervals of time) but will be damaged at temperatures (150°–200° C.) which are proposed by Connett. Therefore, it is presently preferred to operate at temperatures of 110°–130° C. At such temperatures, a non cross-linked thermoplastic material to be used as an inner layer of the improved flexible laminate is sufficiently soft to ensure that it can be properly shaped along one side of a paper layer. For example, such procedure can be resorted to for the making of patent leather but also to make imitation alligator, crocodile and like skins. The layers of the coating are sufficiently soft to permit profiling of the exposed surface of the coating with a plate, roller or any other suitable tool. The pressure of such tool suffices to force the material of the coating into the recesses of the substrate and to simultaneously profile the exposed surface of the coating.

Another important advantage of the improved method and laminate over prior proposals is that the application of heat and pressure takes place only once. This is in contrast to the proposal of Connett who must apply heat and pressure on two occasions in order to ensure the making of a sandwich-like structure. This not only involves the expenditure of additional energy but also enhances the likelihood of damage to the substrate.

A presently preferred flexible laminate can be used as patent leather wherein the substrate 2 (FIG. 1) carries a coating 1 having an inner layer 3 and a composite outer layer replacing the outer layer 6 of FIG. 1 and having three strata. The innermost stratum consists of colored plastic material, such as polyurethane, having a dry weight of approximately 20 g/m$^2$. The innermost stratum can be black or can have any other color or a combination of two or more colors, e.g., depending on the prevailing fashion requirements pertaining to the making of footwear, handbags and the like. The intermediate stratum of the outer layer can consist of transparent polyurethane having a dry weight of about 20 g/m$^2$. Such intermediate stratum can adhere to a third stratum, e.g., a film of separation promoting lacquer which facilitates detachment of a carrier foil from the outer layer on the leather substrate. If used at all, the film of lacquer is very thin and can have a dry weight of 1–2 g/m². The main purpose of the transparent film of lacquer is to separate the carrier from the outer layer; the carrier constitutes a blank foil with a very smooth surface. The outer layer adheres to the substrate upon completion of the pressure applying step.

The just discussed laminate or outer layer can be applied with equal or similar advantage to undamaged substrates of leather. Such laminate exhibits the advantage that it is highly flexible so that a single application of a ram or another suitable tool suffices to deform the laminate from one side all the way to the other side. Moreover, the laminate has a pronouncedly lustrous (shiny) surface which is particularly desirable if the flexible laminate is to be used as patent leather. The appearance is even further enhanced if the laminate is profiled to resemble an alligator skin, a sheet of ostrich leather or the like.

Another important advantage of the improved laminate and method over the teaching of Connett is that the improved laminate exhibits a superior strength. The reason is believed that the inner layer of the improved laminate at least nearly completely fills the unevennesses in and thus enhances the strength of the substrate. Connett merely forms a sandwich which does not contribute to the strength of the substrate but merely adds to such substrate a layer of (cross-linked) plastic material having a particular strength. Therefore, the substrate of the laminate proposed by Connett is likely to tear along the scratches, scars and/or other damaged portions.

EXAMPLE 1

One side of a pigskin was treated with sand paper (grain No. 170). A layer of black plastic lacquer was applied to one side of a paper sheet to constitute the outer layer of a coating for the pigskin. In the next step, a hotmelt was applied over the exposed surface of the outer layer so that the resulting inner layer had a weight of 30 grams per square meter. The material of the inner layer was a polyamide, namely EUROLAN (Trademark) which is sold by Schering. The inner layer was placed over the treated side of the pigskin and the two layers were pressed against the pigskin at a pressure of 40 kiloponds per square meter and a temperature of 130° C. for an interval of 3 seconds. In the next step, the paper carrier was separated from the outer layer of the coating of the resulting flexible laminate.

EXAMPLE 2

One side of a polyester foil was coated with a separating agent (lacquer known as C.A.B. and sold by Eastman). An aliphatic polyurethane (sold by Bayer) was applied over the separating agent to constitute the outer layer of the coating. Tests were made with pigmented and colorless polyurethane. The outer layer was applied in the form of a sheet with a weight of 15 grams per square meter and in dry condition. The inner layer consisted of polyamide which was applied in the form of a sheet with a weight of 45 grams per square meter. The resulting coating was applied to the polished surface of a skiver so that the polished surface was contacted by the polyamide sheet. The applying step involved the application of a pressure of 40 kiloponds per square centimeter at a temperature of 130° C. for an interval of 3 seconds. The ram of the apparatus in which the applying step was carried out was provided with a profiled platen which was caused to profile the outer surface of the outer layer through the carrier. The carrier was thereupon separated from the outer layer of the coating on the resulting flexible laminate.

EXAMPLE 3

One side of an embossed silicon paper carrier was coated with a film of polyurethane (outer layer) which was thereupon provided with a film of thermally activatable material to form the inner layer. The inner layer was applied over the outer layer by a suitable nozzle. The material of the inner layer was a polyester resin (supplied by Dynamit AG) at a weight of 25 grams per square meter. A soluble coloring agent (Sudan, distributed by BASF) was admixed to the polyester resin prior to its application over the outer layer. The paper carrier was placed by hand over an embossed platen so that the inner layer was facing upwardly, and the substrate was placed over the inner layer. The platen was placed into a press and the paper carrier was pressed toward the substrate so that the inner layer was compelled to penetrate into and equalize the unevennesses of the adjacent side of the substrate. The just described applying operation was carried out at an elevated temperature and for an interval of time which was too short to entail a pronounced heating of the substrate. Such relatively short interval of pressurization in the press sufficed to ensure the establishment of a reliable bond between the substrate and the inner layer of the coating. The press was thereupon opened and the paper carrier was peeled off the outer layer of the coating of the resulting flexible laminate.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A flexible laminate comprising a low-grade or damaged leather substrate having a first side and a second side, at least one of said sides having unevennesses; and a coating adjacent said one side and having a first surface which adheres to said one side and a second surface facing away from said substrate, said coating comprising an outer layer adjacent said second surface and an inner layer disposed between said outer layer and said substrate and at least substantially filling the unevennesses of said one side, said inner layer consisting of a non cross-linked thermoplastic material which is flowable in response to heating and said inner layer having a dry weight of 15–50 g/m², said thermoplastic material being applied to the one side of the substrate at a temperature of 110°–130° C. and at a pressure of approximately 30–50 kp/cm² in dependency on selected temperature, said outer layer consisting of a plastic material which is solid within the temperature range causing the non cross-linked thermoplastic material of the inner layer to flow.

2. The laminate of claim 1, wherein said second surface is profiled.

3. The laminate of claim 1, wherein at least a portion of said inner layer is a hotmelt.

4. The laminate of claim 1, wherein said outer layer comprises a plurality of superimposed strata including an inner colored stratum and a light transmitting second stratum of polyurethane outwards of said colored stratum.

5. The laminate of claim 4, wherein said colored stratum contains polyurethane.

6. The laminate of claim 4, wherein said colored stratum has a dry weight of approximately 20 $g/m^2$.

7. The laminate of claim 4, wherein said light transmitting second stratum has a dry weight of approximately 20 $g/m^2$.

8. The laminate of claim 4, wherein said outer layer further comprises a third stratum containing a lacquer and disposed outwards of said second stratum.

9. The laminate of claim 8, wherein said third stratum has a dry weight of 1–2 $g/m^2$.

10. A method of making a flexible laminate comprising the step of applying to an uneven side of a leather-containing substrate, a coating having a first surface which adheres to and at least substantially fills the unevennesses in the uneven side of the substrate and a second surface facing away from the substrate, the coating having an inner layer of non cross-linked thermoplastic material which is flowable in response to heating and has a dry weight of 15–50 $g/m^2$ and said applying step including heating the inner layer to a temperature of 110°–130° C. and pressing the inner layer against the uneven side of the substrate at a pressure of 30–50 $kp/cm^2$, the coating further having an outer layer adjacent said second surface and consisting of a plastic material which is solid within the temperature range causing the non cross-linked thermoplastic material of the inner layer to flow.

* * * * *